J. E. Thomas,
Casting Pipe.
N° 44,563.     Patented Oct. 4, 1864.
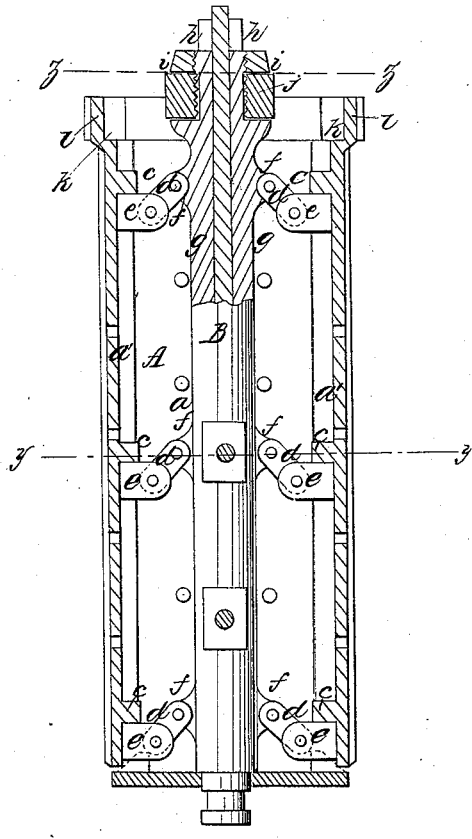
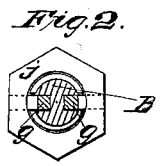
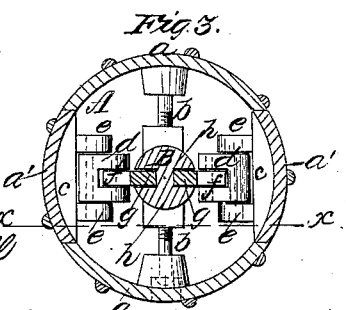
Witnesses:
James P Hall
Henry Harrison
Inventor:
James E Thomas
per Munn & Co.
Attorneys

UNITED STATES PATENT OFFICE.

JAMES E. THOMAS, OF PITTSBURG, PENNSYLVANIA.

IMPROVED CORE-BARREL.

Specification forming part of Letters Patent No. 44,563, dated October 4, 1864.

*To all whom it may concern:*

Be it known that I, JAMES E. THOMAS, of Pittsburg, in the county of Allegheny and State of Pennsylvania, have invented a new and Improved Core-Barrel; and I do hereby declare that the following is a full, clear, and exact description thereof, which will enable those skilled in the art to make and use the same, reference being had to the accompanying drawings, forming part of this specification, in which—

Figure 1 represents a vertical section of this invention, taken in the plane indicated by the line $xx$, Fig. 2. Fig. 2 is a horizontal section of the same, the plane of section being indicated by the line $y\,y$, Fig. 1. Fig. 3 is a similar section of the center bar, the line $z\,z$, Fig. 1, indicating the plane of section.

Similar letters of reference indicate corresponding parts.

This invention consists in the application to the center bar of a core-barrel of a screw and nut, in combination with toggle-arms attached to slides, and with movable sections, in such a manner that by the combined action of said screw and nut and of the toggle-arms two or more of the sections of the barrel are drawn inward and upward, and at the same time the remaining sections are relieved and allowed to collapse; or, by reversing the motion of the nut the several sections are moved back to their original position and the barrel is restored to its original shape and size.

The barrel A is composed of four (more or less) sections, $a\,a'$, which are fitted together by cutting the adjoining edges of the several sections in the manner as clearly shown in Fig. 2 of the drawings.

The sections $a$ are connected to the center bar, B, by means of radiating screws $b$, which are inserted through holes in said sections and screwed into bosses or lugs attached to the center bar. The heads of these screws are let into cavities, and said screws are made of such a length that when the barrel is expanded to its full capacity their heads bear on the bottoms of the mortises, as shown in Fig. 2. The shanks of said screws, however, pass freely through their holes, so that when the sections $a'$ are removed the sections $a$ are free to move toward the center bar.

The sections $a'$ are strengthened by transverse ribs $c$, secured to their inner surfaces, and they connect with the center bar by toggle-arms $d$, which are hinged at one end to lugs $e$, projecting from the sections $a'$, and at the opposite end to ears $f$, projecting from slides $g$, which move in longitudinal grooves $h$, cut into the surface of the center bar, one opposite the other, as clearly shown in the drawings.

Each of the slides $g$ is provided near its upper end with a recess, $i$, to straddle a nut, $j$, which screws on the upper end of the center bar, so that by turning this nut in one direction the slides are pushed down in the grooves $h$, and by turning the nut in the opposite direction the slides are drawn up. If by the action of the nut the slides are moved up to the position shown in Fig. 1 of the drawings, the toggle-arms $d$ assume an oblique position toward the center line of the barrel and the sections $a'$ are drawn in, and if the motion of the screw continues in the same direction, the sections $a'$ are compelled to move upward. By this combined motion the sections $a'$ are relieved and allowed to move on the radial screws $b$ toward the center of the barrel, and the diameter of the barrel is reduced. If the screw is turned down, the sections $a'$ are first moved down and then the toggle-arms begin to straighten and to force said sections out from the center. In moving in this direction the edges of the sections $a'$ strike the edges of the sections $a$ and carry them back to their original position, and the barrel is restored to its proper shape.

The sections $a\,a'$ are provided at their upper ends with shoulders $k$ and projecting flange $l$, so that by one and the same core-barrel the body of the pipe and its bowl can be molded.

By the employment of my core-barrel the use of straw or hay ropes can be done away with.

I claim as new and desire to secure by Letters Patent—

The longitudinally-moving slides $g$, in combination with the toggle-arms $d$, screws $b$, and sections $a\,a'$, constructed and operating substantially as and for the purpose herein shown and described.

JAMES E. THOMAS.

Witnesses:
FRITZ BUTTLAS,
ROBT. D. CLARK.